United States Patent

Sato et al.

[11] Patent Number: 5,524,221
[45] Date of Patent: Jun. 4, 1996

[54] NEXT INSTRUCTION POINTER CALCULATION SYSTEM FOR A MICROCOMPUTER

[75] Inventors: Fumiki Sato; Kouichi Fujita, both of Hyogo-ken, Japan

[73] Assignee: Mitsubishi Denki Kabushiki Kaisha, Tokyo, Japan

[21] Appl. No.: 311,833

[22] Filed: Sep. 23, 1994

Related U.S. Application Data

[63] Continuation of Ser. No. 834,432, Feb. 13, 1992, abandoned.

[30] Foreign Application Priority Data

Feb. 18, 1991 [JP] Japan ................................. 3-045883

[51] Int. Cl.$^6$ ............................... G06F 9/22; G06F 9/30
[52] U.S. Cl. ................... 395/375; 364/262.4; 364/262.8; 364/263.1; 364/DIG. 1
[58] Field of Search ............................................. 395/375

[56] References Cited

U.S. PATENT DOCUMENTS

| | | | |
|---|---|---|---|
| 4,742,451 | 5/1988 | Bruckert et al. | 395/375 |
| 4,897,787 | 1/1990 | Kawasaki et al. | 395/375 |
| 4,926,323 | 5/1990 | Baror et al. | 395/375 |
| 5,129,068 | 7/1992 | Watanaba et al. | 395/400 |
| 5,241,637 | 8/1993 | Skruhak et al. | 395/375 |

*Primary Examiner*—Kevin J. Teska
*Assistant Examiner*—Ayni Mohamed
*Attorney, Agent, or Firm*—Townsend and Townsend and Crew

[57] ABSTRACT

A microcomputer comprising an internal decoder for addressing instruction codes in an instruction prefetch buffer, a words field provided preferably in a micro ROM for storing number of words which indicate lengths of various instructions, and position calculating means provided in the bus interface unit for inputting the number of words to indicate an address of instruction code in the instruction prefetch buffer, so that the instruction code is read out concurrently with the execution of the micro instruction.

4 Claims, 4 Drawing Sheets

NEXT INSTRUCTION POINTER CALCULATION SYSTEM FOR A MICROCOMPUTER

This is a Continuation of application Ser. No. 07/834,432, filed Feb. 13 1992, now abandoned.

BACKGROUND OF THE INVENTION

1. Field of the Invention

The present invention relates to a microcomputer, and particularly to an improvement in processing speed.

2. Description of the Prior Art

FIG. 3 is a diagram showing a microcomputer M as an prior art. In the Figure, numeral 1 represents a ROM storing micro instructions (hereinafter called a micro ROM), numeral 2 represents an address field in the micro ROM, numeral 3 represents a micro instruction field, numeral 4 represents an address decoder for the micro ROM 1, numeral 5 denotes an execution unit, numeral 6 denotes an instruction prefetch buffer for fetching various instructions, numeral 7 denotes a bus interface unit, and numeral 8 denotes a data pointer for showing data to be read out next in the instruction prefetch buffer. Numeral 9 denotes an external data bus, numeral 10 denotes an external address bus, and numeral 11 denotes an external control signal line. The microcomputer M is connected to an external memory and peripherals through the buses 9, 10, and the signal line 11.

The operation will be explained hereinafter. FIG. 4 shows the operation of the microcomputer in the prior art.

Here, it is assumed that the microcomputer executes instructions which use immediate data. A RAM of an external memory 19 stores user programs ADD $R_A$, IMML, etc. Those programs are transferred to the prefetch buffer 6 in such a way as ADD $R_A$, IMML, IMMH, SUB $R_B$ through the bus lines 9, 10, and 11 at every step instruction.

Referring to FIG. 4, in a cycle which begins from a time t0, the execution unit 5 requests the bus interface unit 7 for next instruction code in accordance with the last micro instruction of the previous instruction, and "1" is added to contents of a program counter 18. The bus interface unit 7 receives this request and add "1" to the data pointer 8, and the data (instruction code) from the instruction prefetch buffer 6 is sent to the address decoder 4 if the data is effective. This data is decoded by the address decoder 4, the micro ROM 1 is accessed, the micro ROM 1 constructs an instruction code, and a micro instruction which is to be executed firstly is outputted from the micro ROM 1 to the execution unit 5. At the same time, the micro ROM 1 outputs an address of the micro instruction, which is to be accessed next, to the address decoder 4.

In a cycle which begins at a time t1, the execution unit 5 executes firstly the inputted micro instruction. Then, the execution unit 5 requests the bus interface unit 7 for the immediate data which is necessary to execute the instruction, and adds the number of words of the immediate data, which are previously read out, to the contents of program counter 18. The bus interface unit 7 reads out the next data (immediate data) responding to a request from the instruction prefetch buffer 6 if the data is effective, and add the number of words of the data to the data pointer 8.

At a next t2 cycle, the execution unit 5 requests the bus interface unit 7 for the next instruction code in accordance with the previous micro instruction. The micro ROM 1 is again accessed in accordance with the instruction code (data) outputted from the instruction prefetch buffer 6. Hereinafter, the above-mentioned operations at t0 and t1 are repeated, so that the microcomputer M executes each instruction of the user programs.

Since the conventional microcomputer executes the instructions in such a way as described above, unless after the executions of each micro instruction in which the last data in the instruction is requested, the position of the next instruction code in the instruction prefetch buffer 6 is unknown.

SUMMARY OF THE INVENTION

The object of the present invention, in view of the above-mentioned problem, is to provide a microcomputer in which the position of the next instruction code can be known prior to an execution of the micro instruction in which the last data in the instruction is requested, thereby enabling a high speed processing.

The microcomputer according to the present invention, as shown in FIG. 1, having a bus interface unit 7 for fetching user program consisting of various instruction codes from outside, an instruction prefetch buffer 6 for inputting and storing a plurality of instruction codes from the bus interface unit 7, a decoder 4 for inputting data of the instruction codes read out from the instruction prefetch buffer 6 and generating addresses, a micro ROM 1 which previously stores various micro instructions conducting each step of the execution of the instruction, and an execution unit 5 for inputting and processing the micro instructions read out from the micro ROM 1 in accordance with the addresses, comprises: an internal decoder 17 for addressing the instruction codes in the instruction prefetch buffer 6, a number-of-word field 12 to be provided preferably in the micro ROM 1 for storing the number of words which indicate lengths of the various instructions, and position calculating means 14 provided in the bus interface unit 7 and for inputting the number of words and indicating the addresses of the instruction codes in the instruction prefetch buffer 6.

In the microcomputer according to the present invention, the position calculating means 14 obtains the position of the instruction code of the step to be read out next in the instruction prefetch buffer 6 in accordance with data placed in the field 12 in the micro ROM 1 which indicate the number of words of the instruction. Thus, at the same time that the micro instruction of the previous instruction code is executed, an instruction code of the next step can be read out from the instruction prefetch buffer 6. Accordingly, the number of items for executing pipeline processing increases so that processings in the microcomputer will become significantly faster as a whole.

The above and other objects, features, and advantages of the invention will become more apparent from the following description when taken in conjunction with the accompanying drawings.

DESCRIPTION OF THE PREFERRED EMBODIMENT

Figure 1:
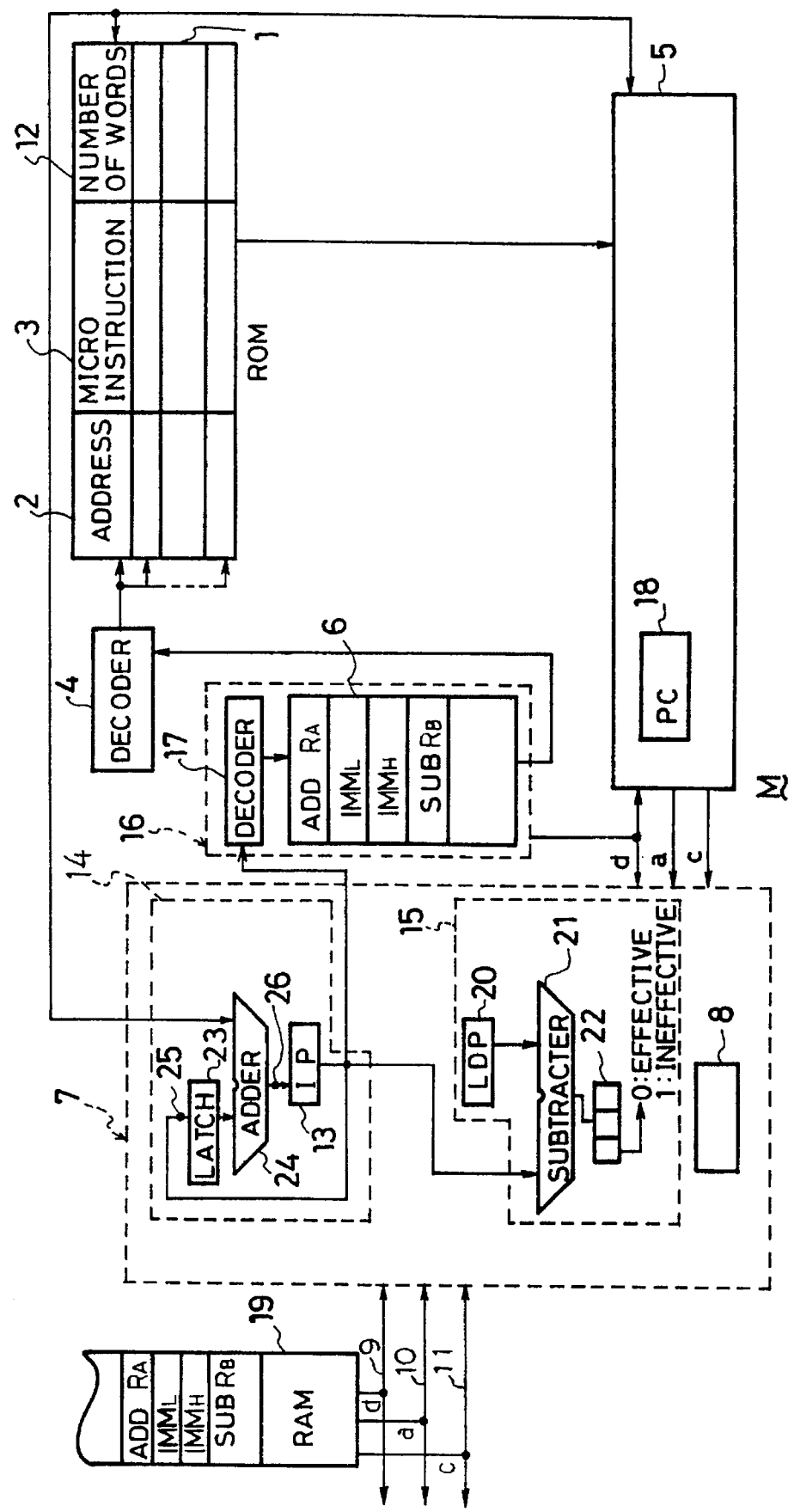
FIG. 1 is a block diagram showing a microcomputer according to an embodiment of the present invention.

FIG. 1 is a block diagram showing an embodiment of a microcomputer according to the present invention. In FIG. 1, numeral 1 represents a ROM for storing micro instructions (hereinafter called a micro ROM), numeral 2 denotes an address field in the micro ROM 1, numeral 3 denotes a micro instruction field, numeral 12 denotes a number-of-word field for indicating the number of words representing the length of the various instructions. Numeral 4 denotes an address decoder for the micro ROM 1, numeral 5 denotes an execution unit for processing the micro instruction. Numeral 6 denotes an instruction prefetch buffer for fetching each instruction, numeral 7 denotes a bus interface unit, numeral 8 denotes a data pointer for indicating the position of operand to be read out next, numeral 13 denotes an instruction code pointer for outputting the position of an instruction code to be read out next, numeral 9 denotes an external data bus, numeral 10 denotes an external address bus, and numeral 11 denotes an external control signal line. Through those buses and signal line, the microcomputer is connected to a RAM 19 of an external memory and peripherals. Numeral 14 denotes position calculating means, numeral 15 denotes determination means for determining whether data indicated by the instruction code pointer 13 is effective or ineffective, numeral 16 denotes instruction standby means for sending data of the instruction code indicated by the instruction code pointer 13 to the address decoder 4. Numeral 17 denotes an internal decoder for the instruction prefetch buffer 6, numeral 18 denotes a program counter in the execution unit 5, numeral 23 denotes a data latch for holding the contents of the instruction code pointer 13 temporarily, and numeral 24 denotes an adder for adding the contents of the data latch 23 to the data from the micro ROM 1.

The data latch 23, adder 24, and the instruction code pointer 13 form the position calculating means 14 which calculates the positions of the instruction codes. Also, an output of the instruction code pointer 13 is supplied to an input of the data latch 23 through a switching gate 25, and at the same time, supplied to the internal decoder 17 in the instruction standby means 16. Between the adder 24 and the instruction code pointer 13, an other switching gate 26 is provided.

The determination means 15 consists of a last data pointer (LDP) 20, a subtracter 21, and a register 22. The output of the instruction code pointer 13 is supplied to one input of the subtracter 21 and an output of an LDP 20 is supplied to other input. The LDP 20 is a pointer for indicating a boundary between an effective data and an ineffective data in the instruction prefetch buffer 6, which defines the instruction code as effective when the highest order bit outputted from the subtracter 21 is "0" and defines the instruction code as ineffective when the highest order bit is "1".

The data lengths of the instruction which form the user programs are different from each other and the number of words of the instructions are variable.

The operation will be explained hereinafter. Here, it is assumed that the microcomputer executes an instruction which uses immediate data (program built-in data). Also, the user program is read from the RAM 19 and is moved to the instruction prefetch buffer 6.

Figure 2:
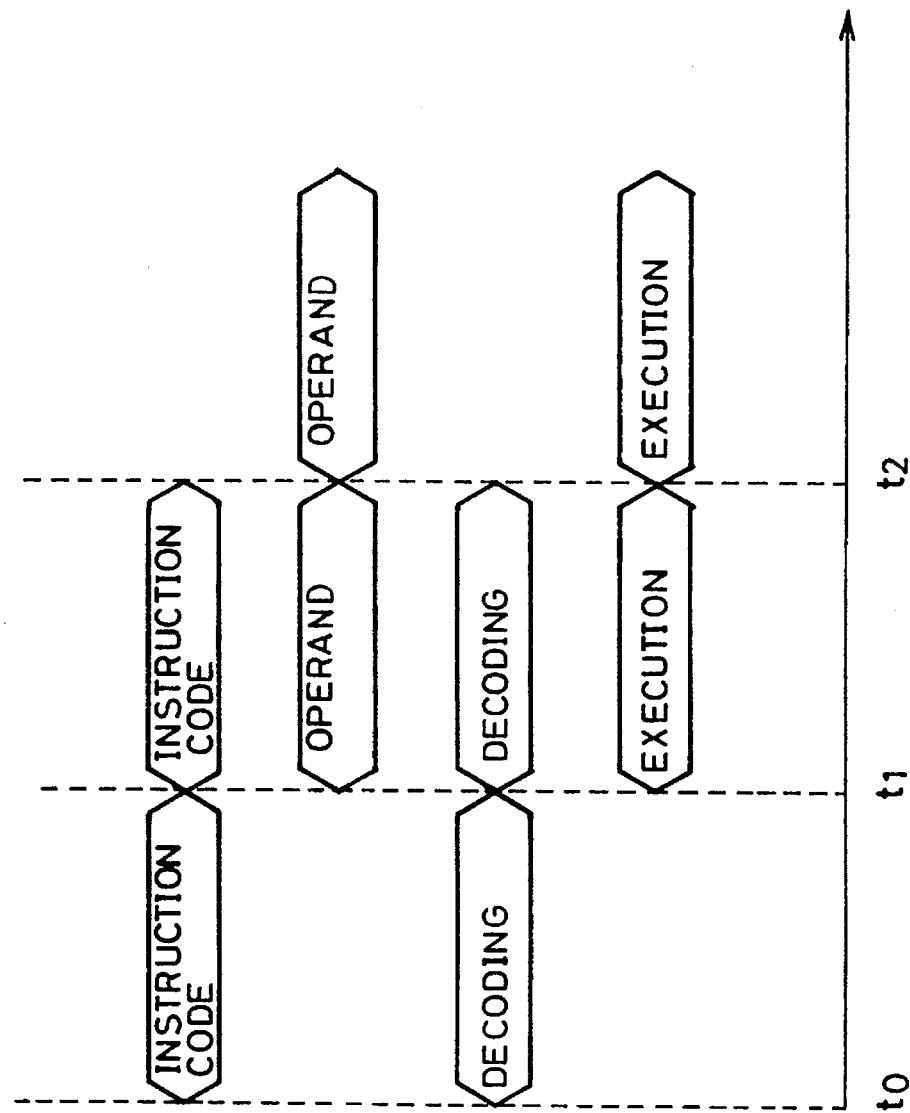
FIG. 2 is a timing chart showing the operation of the present invention.
Figure 3:
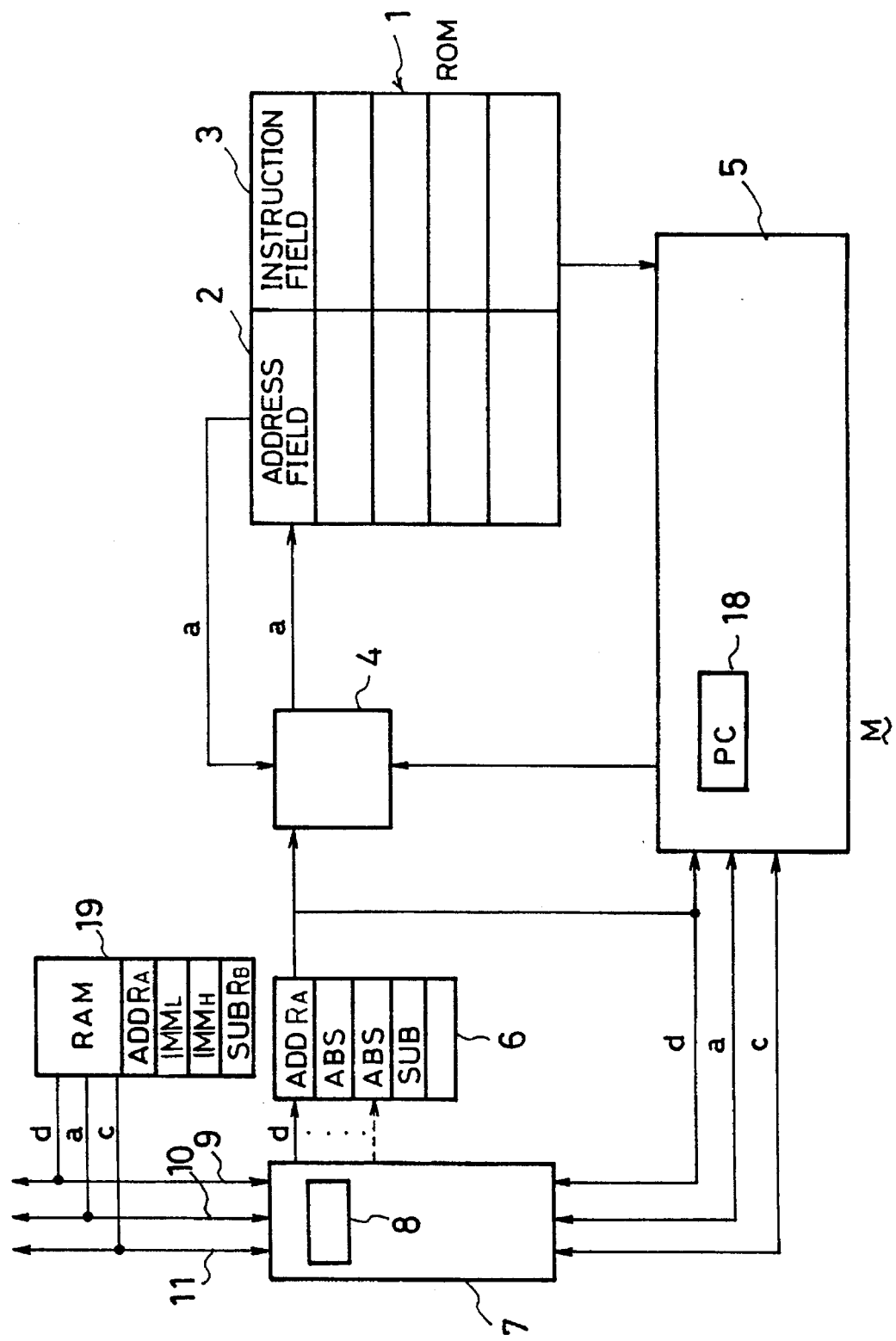
FIG. 3 is a block diagram showing a conventional microcomputer.
Figure 4:
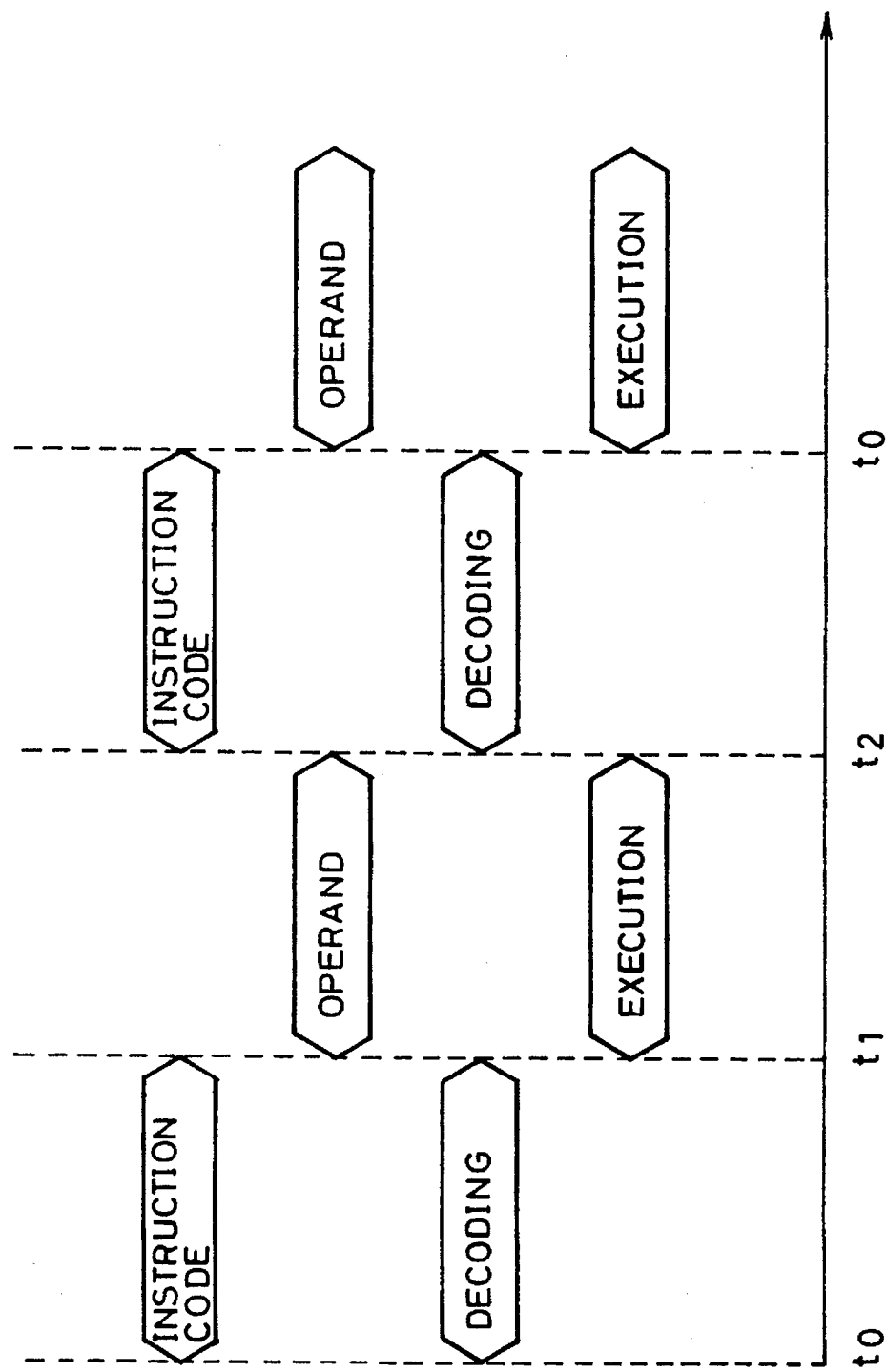
FIG. 4 is a timing chart showing a conventional operation.

Referring to FIG. 2, at the beginning of a cycle which begins at a time t0, the execution unit 5 requests the bus interface unit 7 for the next instruction code in accordance with the last micro instruction of the previous instruction. The data which designates the position of this instruction code is outputted from the instruction code pointer 13 and is stored in the data latch 23. This data is decoded by the internal decoder 17, the requested data (instruction code) is sent from the instruction prefetch buffer 6 to the address decoder 4 if the data is effective and the micro ROM 1 is accessed. The micro ROM 1 outputs a micro instruction (This micro instruction forms an instruction, and according to it, the execution unit 5 executes the instruction and requests for an instruction code of the next instruction.) to be executed at a next cycle to the execution unit 5. Also, the micro ROM 1 outputs an address of the micro instruction to be accessed at a next cycle to the address decoder 4. In this case, the address indicates the end of this instruction. Further, the micro ROM 1 outputs the number of words of this instruction to the bus interface unit 7 and the execution unit 5 in accordance with the number-of-word field. The bus interface unit 7 receives the number of words and adds the number of words to the contents of the instruction code pointer 13. In addition, the execution unit 5 adds the number of words to the contents of the program counter 18. In a cycle which begins at a next time t1, the execution unit 5 executes the received micro instruction. At the same time, the execution unit 5 requests the bus interface unit 7 for the next immediate data and an instruction code of the next instruction in accordance with the micro instruction of the previous cycle. The bus interface unit 7, if the requested data (immediate data) is effective, reads out the data (immediate data) of the requested number of words from the instruction prefetch buffer 6 and sends it to the execution unit 5. The bus interface unit 7 adds the number of words to the contents of the data pointer 8, and if the requested data (instruction code) is effective, the instruction prefetch buffer 6 decides an address by using the position calculating means 14, so that data corresponding to the requested instruction code is sent to the address decoder 4. The adder 24 is used to add the number of words sent from the micro ROM 1 to the contents of the instruction code pointer 13. At this time, if the data pointer 8 coincides with the instruction code pointer 13, "1" is added to the contents of the data pointer 8.

Thus, the microcomputer according to the present invention executes the instructions of the user programs in parallel processing. At the time t1, the number of words of the instruction is inputted to the adder 24 of the position calculating means 14 from the number-of-word field of the micro ROM 1, and the position data of the instruction code pointer 13 at the last time (time t0) also is inputted to the adder 24 from the data latch 23. The adder 24 outputs those added values to the instruction code pointer 13. This value becomes address data of the instruction code to be read out next. That is, the position calculating means 14 can obtain the position, for example of "SUB $R_B$" to be read out next in the instruction prefetch buffer 6 at the time that the micro instructions of "ADD $R_A$" which were previously read out are read out from the micro ROM 1. By obtaining the number of words before an execution of the micro instruction in which the last data in the instruction is requested, the position of the instruction code to be read out next can be obtained. Consequently, the read out timing from the instruction prefetch buffer 6 can be earlier. In addition, the number of words which indicate the length of the instruction is stored in the micro ROM, so that manufacturing of this will be easier than other memories. In addition, the structure can be simplified since the position calculating means 14 can be constructed only by the latch 23, adder 24, and the code pointer 13.

According to the present invention, as described above, there are provided the internal decoder for addressing the instruction code in the instruction prefetch buffer, the number-of-word field disposed in the micro ROM and for storing the number of words which indicate the lengths of various instructions, and the position calculating means disposed in the bus interface unit and for inputting said number of words to indicate the address of the instruction code in the instruction prefetch buffer, so that the position of the instruction code of the instruction to be executed next in the instruction prefetch buffer can be obtained from the data placed in the field which indicate the number of instruction words of the micro ROM. Before the execution unit completes all processings of the instructions, an instruction code of the next instruction can be read out, so that a microcomputer capable of high-speed processing can be provided.

What is claimed is:

1. A microcomputer comprising:

an instruction prefetch buffer to prestoring a plurality of instruction codes which are provided from a bus interface for fetching and processing a program from an external memory;

a micro-instruction execution unit for executing a micro-instruction accessed by an instruction code;

a micro-instruction storage means for storing a plurality of micro-instructions as well as information on the number of words of each micro-instruction and for providing an accessed micro-instruction to the micro-instruction execution unit as well as information on the number of words of this micro-instruction to the micro-instruction execution unit when the micro-instruction is accessed; and an instruction pointer value calculation means for adding information on the location of an instruction code required to read the micro-instruction in the instruction prefetch buffer to information on the number of words of the micro-instruction to obtain an instruction pointer value, wherein, during the period until preceding micro-instruction is executed by the micro-instruction execution unit, the instruction pointer value calculation means calculates the instruction pointer value and provides it to the instruction prefetch buffer to access a subsequent instruction code and provide a subsequent micro-instruction specified by the accessed instruction code to the micro-instruction execution unit.

2. A microcomputer according to claim 1, wherein the instruction pointer value calculation means is provided in the bus interface.

3. A microcomputer comprising:

an instruction prefetch buffer to prestoring a plurality of instruction codes which are provided from a bus interface for fetching and processing a program from an external memory;

a micro-instruction execution unit for executing a micro-instruction accessed by an instruction code;

a micro-instruction storage means for storing a plurality of micro-instructions as well as information on the number of words of each micro-instruction and for providing an accessed micro-instruction to the micro-instruction execution unit as well as information on the number of words of this micro-instruction when the micro-instruction is accessed;

a decision means for determining whether immediate data requested by the micro-instruction is effective or ineffective; and an instruction pointer value calculation means for adding information on the location of an instruction code required to read micro-instruction in the instruction prefetch buffer to instruction on the number of words of the micro-instruction to obtain an instruction pointer value when the decision means determines that the immediate data is effective, wherein, during the period until a preceding micro-instruction is executed by the micro-instruction execution unit, the instruction pointer value calculation means calculates the instruction pointer value and provides it to the instruction prefetch buffer to access a subsequent instruction code and provide a subsequent micro-instruction specified by the accessed instruction code to the micro-instruction execution unit.

4. A microcomputer according to claim 3, wherein the instruction pointer value calculation means and the decision means are provided in the bus interface.

* * * * *